United States Patent
Epple et al.

(12) 
(10) Patent No.: US 6,258,897 B1
(45) Date of Patent: Jul. 10, 2001

(54) POLYESTER POLYOLS OF LOW MOLAR MASS, THEIR PREPARATION AND USE IN COATING COMPOSITIONS

(75) Inventors: Ulrich Epple; Ulrike Kuttler; Claudia Pietsch, all of Graz (AT)

(73) Assignee: Vianova Resins AG, Werndorf (AT)

( * ) Notice: Subject to any disclaimer, the term of this patent is extended or adjusted under 35 U.S.C. 154(b) by 0 days.

(21) Appl. No.: 09/583,735

(22) Filed: May 31, 2000

Related U.S. Application Data

(62) Division of application No. 09/263,624, filed on Mar. 5, 1999.

(30) Foreign Application Priority Data

Mar. 6, 1998 (DE) ............................................. 198 09 461

(51) Int. Cl.[7] ............................. C08F 20/00; C08G 63/00
(52) U.S. Cl. ..................... 525/437; 528/272; 528/295.3; 528/296; 528/298; 528/300; 528/302; 528/307; 528/308; 525/445
(58) Field of Search ................................ 528/272, 295.3, 528/296, 298, 300, 302, 307, 308; 525/437, 445

(56) References Cited

U.S. PATENT DOCUMENTS

| | | | |
|---|---|---|---|
| 5,608,012 | 4/1997 | Epple et al. | 525/374 |
| 5,825,122 | 12/1998 | Epple et al. | 525/191 |

FOREIGN PATENT DOCUMENTS

| | | |
|---|---|---|
| 0 638 591 | 8/1994 | (EP) . |
| 0 705 858 | 4/1996 | (EP) . |
| 0 741 149 | 11/1996 | (EP) . |
| 0 776 920 | 6/1997 | (EP) . |
| 4-258678 | 9/1992 | (JP) . |
| 48-47595 | 7/1993 | (JP) . |

Primary Examiner—Samuel A. Acquah
(74) Attorney, Agent, or Firm—Foley & Lardner

(57) ABSTRACT

Low molar mass polyester polyols having a weight-average molar mass $M_w$ of not more than 2000 g/mol, with hydroxyl numbers of from 80 to 300 mg/g and acid numbers of from 5 to 35 mg/g, comprising the stated mole fractions (in %=mol/100 mol) of structural units derived from:

a) from 1 to 45% of aliphatic polycyclic polyhydroxy compounds having at least two hydroxyl groups per molecule, b) from 5 to 50% of branched aliphatic acyclic dihydroxy compounds, c) from 30 to 50% of aliphatic cyclic polycarboxylic acids, d) from 0 to 30% of aliphatic acyclic or monocyclic polyhydroxy compounds having three or more hydroxyl groups per molecule, and e) from 0 to 10% of polyfunctional compounds selected from aliphatic linear and monocyclic dihydroxy compounds, aliphatic linear and branched dicarboxylic acids, aromatic dicarboxylic acids and polycaboxylic acids having three or more carboxyl groups per molecule, and also f) from 0 to 10% of monofunctional units selected from monocarboxylic acids and monoalcohols, the mole fractions indicated in each case under a), b), c), d), e) and f) adding up to 100% and use of these low molar mass polyester polyols or mixtures thereof of copolymers in one- and two-component coating materials and also spray surfacers.

13 Claims, No Drawings

POLYESTER POLYOLS OF LOW MOLAR MASS, THEIR PREPARATION AND USE IN COATING COMPOSITIONS

This application is a divisional of application Ser. No. 09/263,624, filed Mar. 5, 1999.

BACKGROUND OF THE INVENTION

1. Field of the Invention

The present invention relates to polyester polyols of low molar mass, their preparation and use in coating compositions.

2. Description of Related Art

Presently used two-component polyurethane coating materials are based on anhydroxy-functional polyesters or polyacrylates, on acrylic-modified polyesters or polyester-modified polyacrylates, or mixtures of these resins, and are more environmentally compatible than their prior art counterparts. This is because presently used two component polyurethane coating materials generally require less solvent for dilution, thus enabling them to be formulated to give a ready-to-spray transparent or pigmented coating material or surfacer. These low-solvent or high-solids coating materials can only be prepared because the hydroxy-functional polymers employed (also referred to as binders), still exhibit sufficiently good physical initial drying despite their low degree of polymerization.

In order to have sufficient initial drying (i.e. short time span until the applied coating is no longer tacky) properties, these low molar mass polyols must comprise rigid chain units, which initially reduces the solution viscosity and at the same time leads to glass transition temperatures ($T_g$) of at least 20° C. It is precisely at very low degrees of polymerization that the dependence of the glass transition temperature on the degree of polymerization is critical, and predictions made on the basis of additivity equations which link the mass fraction or weighted molar proportions of the units with the $T_g$ are generally not valid. One is forced to look for suitable units on a purely empircal basis which will then, it is hoped, lead to a low molar mass polymer having the desired properties described above.

Examples of acrylate polyols which, in pure form or as mixtures, generally meet these requirements are described for example in EP-A 0 638 591 and EP-A 0 741 149. Coating compositions based on these branched polymers are notable for good weathering stability, high solids contents, rapid drying, a long pot life (at least 8 hours) and, in particular, the possibility of universal application in intermediate coats and in pigmented and unpigmented systems.

Examples of polyester polyols that have aliphatic branched and monocyclic units are also described in EP-A 0 705 858. They are notable for good weathering stability, high solids contents, good elasticity, and rapid drying. However, they have disadvantages in terms of their adhesion to various substrates, such as base coat in automotive refinish, and various metallic substrates (cold-rolled sheet iron).

Surprisingly it has now been found that two-component polyurethane coating materials which comprise, as a hydroxy-functional component, low molar mass polyester polyols of the present invention, which are based on selected starting materials and are described in more detail below, possess one or more of certain favorable properties including those referred to above and, moreover, exhibit good adhesion to base coat in automotive refinshes and to various metallic substrates.

SUMMARY OF THE INVENTION

In accordance with these and other objects, there is provided a low molar mass polyester polyol having a weight-average molar mass $M_w$ of not more than 2000 g/mol, with a hydroxyl number of from 80 to 300 mg/g and an acid number of from 5 to 35 mg/g, comprising mole fractions [in %=mol/(100 mol)] of structural units derived from:

a) from 1 to 45% of an aliphatic polycyclic polyhydroxy compound having at least two hydroxyl groups per molecule;

b) from 5 to 50% of a branched aliphatic acyclic dihydroxy compound;

c) from 30 to 50% of an aliphatic cyclic polycarboxylic acid;

d) from 0 to 30% of an aliphatic acyclic or monocyclic polyhydroxy compound having three or more hydroxyl groups per molecule;

e) from 0 to 10% of a polyfunctional compound selected from the group consisting of aliphatic linear and monocyclic dihydroxy compounds, aliphatic linear and branched dicarboxylic acids, aromatic dicarboxylic acids and polycarboxylic acids having three or more carboxyl groups per molecule; and f) from 0 to 10% of a monofunctional unit selected from the group consisting of monocarboxylic acids and monoalcohols, the mole fractions indicated in each case under a), b), c), d), e) and f) adding up to 100%.

The present invention also includes mixtures and coating materials comprising a low molar mass polyester polyol.

Additional objects, features and advantages of the invention will be set forth in the description which follows, and in part will be obvious from the description, or may be learned by practice of the invention. The objects, features and advantages of the invention may be realized and obtained in whole or in part by means of the instrumentalities and combinations particularly pointed out in the appended claims.

DETAILED DESCRIPTION OF PREFERRED EMBODIMENTS

The low molar mass polyester polyols of the invention preferably comprise aliphatic polycyclic structural units. These units are typically at least bicyclic and each preferably contain at least two functional groups, most preferably hydroxyl groups. At least two of the hydroxyl groups of these units are preferably attached to nonequivalent carbon atoms of the cyclic structures. The term equivalent as it relates to carbon atoms of the cyclic structures described above, refers to those carbon atoms which can be interchanged by an operation of symmetry on the corresponding unsubstituted parent hydrocarbon.

The particular suitability of the low molar mass polyesterpolyols of the invention, inter alia, can be attributed to the nature and proportions of the starting materials on which the low molar mass polyester polyols are based. In this context polycyclic compounds which have been found particularly suitable include those which carry two hydroxyl groups as functional groups.

Good adhesion can be obtained, for example, in particular based on the presence in the low molar mass polyester polyols that include units of 3(4),8(9)-bishydroxymethyltricyclo[5.2.1.0$^{2,6}$]decane ("TCD diol" isomer mixture), a tricyclic dialcohol. TCD diol is, therefore, one of the preferred units according to the invention.

The invention provides low molar mass polyester polyols generally having a weight-average molar mass $M_w$ of not more than 2000 g/mol, with a hydroxyl number of from 80 to 300 mg/g and a acid number of from 5 to 35 mg/g, comprising the stated mole fractions (in %=mol/100 mol) of structural units derived from:

a) from 1 to 45% of aliphatic polycyclic polyhydroxy compounds having at least two hydroxyl groups per molecule, b) from 5 to 50% of branched aliphatic acyclic dihydroxy compounds, c) from 30 to 50% of aliphatic cyclic polycarboxylic acids, d) from 0 to 30% of aliphatic acyclic or monocyclic polyhydroxy compounds having three or more hydroxyl groups per molecule, and e) from 0 to 10% of polyfunctional compounds selected from aliphatic linear and monocyclic dihydroxy compounds, aliphatic linear and branched dicarboxylic acids, aromatic dicarboxylic acids, aromatic hydroxycarboxylic acids, and polycarboxylic acids having three or more carboxyl groups per molecule, and also f) from 0 to 10% of monofunctional units selected from monocarboxylic acids and monoalcohols, the mole fractions indicated in each case under a), b), c), d), e) and f) adding up to 100%.

Preferably, the compounds of groups a) and c) each have 2 functional groups (hydroxyl and/or carboxyl groups).

The molar masses of the polyester polyols can be determined by any known suitable method such as by gel permeation chromatography using polystyrene gel in accordance with known customary methods. The calibration substance used is conventional polystyrene.

The acid number is defined by DIN 53 402 (incorporated herein by reference) as the quotient of the mass $m_{KOH}$ of potassium hydroxide that is required to neutralize a sample for analysis and the mass $m_B$ of this sample (mass of the solid in the sample in the case of solutions or dispersions); its customary unit is "mg/g". The hydroxyl number is defined by DIN 53 240 (incorporated herein reference) as being the quotient of that mass $m_{KOH}$ of potassium hydroxide that has the same number of hydroxyl groups as a sample for analysis and the mass $m_B$ of this sample (mass of the solid in the sample in the case of solutions or dispersions); its customary unit is "mg/g".

Preference is given as component a) to polycyclic aliphatic dihydroxy compounds having 6 to 20, especially 7 to 12 carbon atoms, such as 3(4),8(9)-bishydroxymethyltricyclo[$5.2.1.0^{2,6}$]decane and pinanediol (2,6,6-trimethyl-bicyclo[3.1.1]heptane-2,3-diol). Particular preference is given to the isomer mixture of 3(4),8(9)-bishydroxymethyltricyclo[$5.2.1.0^{2,6}$]decane. One or more components a) can be employed.

As component b) it is preferred to employ one or more aliphatic branched acyclic dihydroxy compounds of 4 to 12 carbon atoms, such as neopentyl glycol, 2-methyl-1,3-propanediol, 2-methyl-2-butyl-1,3-propanediol, 2,2,4-trimethyl-1,3-pentanediol, pinacol, bishydroxymethylheptane, and trimethylhexanediol.

As component c) preference is given to the hydrogenation products of the isomeric phthalic acids, such as hexahydrophthalic acid and 1,4-cyclohexane-dicarboxylic acid. One or more compounds c) can be employed.

Suitable components d) include one or more of aliphatic triols such as glycerol, trimethylolethane and trimethylolpropane, and also higher polyhydroxy compounds such as ditrimethylolpropane, erythritol, pentaerythritol, xylitol and sorbitol. Trimethylolpropane is particularly preferred.

Instead of the acids and hydroxy compounds, it is also possible to employ ester-forming derivatives of these compounds in order to synthesize the low molar mass polyester polyols of the invention. Examples include esters of the acids with lower aliphatic alcohols (of 1 to 4 carbon atoms, linear or branched, primary, secondary or tertiary alcohols), preferably methyl esters, acid anhydrides or acid halides, and also esters of the hydroxy compounds with volatile organic acids, such as acetates or propionates, for example.

The acids and hydroxy compounds can also be replaced in whole or in part by hydroxy acids, which in each case carry at least one hydroxyl group and one acid group;

preference is given to compounds having in each case one hydroxyl and one acid group, and their ester-forming derivatives, such as lactones, for example. Examples of suitable hydroxy acids include γ-hydroxybutyric, δ-hydroxyvaleric and ε-hydroxycaproic acid; these hydroxy acids can also be employed in the form of the lactones. In minor amounts (up to 10% of the molar amount of the hydroxy acids or diols and diacids) it is also possible to employ compounds having one acid group and two or more hydroxyl groups, or else compounds having one hydroxyl group and two or more acid groups; suitable examples include hydroxysuccinic acid and dimethylolpropionic acid. If this is done, the result is polyesters that are branched to a minor extent.

In addition to the components described so far, one or more of the same or different units e) each having two hydroxyl or two or more carboxyl groups can optionally also be a constituent of the low molar mass polyester polyols of the invention. It is also possible to employ the corresponding sulfonic or phosphonic acids.

In this case, particularly suitable precursors e) include one or more linear and/or monocyclic dihydroxy compounds of 2 to 40, preferably 2 to 20 carbon atoms. Examples of suitable linear diols include ethylene glycol, 1,2- and 1,3-propylene glycol, 1,4-butanediol, and 1,6-hexanediol. Also suitable are the oligomeric and polymeric poly(oxyethylene or oxypropylene) glycols. Cyclic diols which are likewise suitable include cyclohexanedimethanol, perhydrobisphenol A, and 1,2- and 1,4-cyclohexanediol.

Further particularly suitable precursors e) include aliphatic linear and branched dicarboxylic acids of 2 to 40, preferably 4 to 36 carbon atoms. Among these compounds, linear dicarboxylic acids, such as oxalic, malonic, glutaric, adipic, suberic and sebacic acid, and also the so-called dimeric fatty acids, are preferred. Suitable branched aliphatic dicarboxylic acids include, for example, dimethylsuccinic, butylmalonic, diethylmalonic, dimethylglutaric, and methyladipic acid. If desired, it is also possible to replace small proportions (up to 10% of the molar amount) of the aliphatic dicarboxylic acids by aromatic dicarboxylic acids, such as the isomeric phthalic acids, 4,4'-sulfonyldibenzoic acid, 4,4'-diphenyl ether dicarboxylic acid and 4,4'-benzophenonedicarboxylic acid. Also included here are aromatic hydroxycarboxylic acids, such as 3,4-dihydroxybenzoic acid, 2,3-dihydroxy4-methylbenzoic acid, and 2,3,4-trihydroxybenzoic acid. Preferably, however, the low molar mass polyester polyols of the invention do not comprise any aromatic compounds, because apparently, they tend to impair the coating properties.

Again, by using at least tribasic acids as a constituent of component e), branched polyesters are obtained. Examples of suitable polybasic acids include cyclohexanetricarboxylic, trimellitic, and butanetetracarboxylic acid.

In addition, it is possible as optional component f) to employ mono-functional units which limit the chain length. Examples include one or more aliphatic monocarboxylic acids of 6 to 20 carbon atoms, such as 2-ethylhexanoic acid, isononanoic acid, and aliphatic monoalcohols of 4 to 20 carbon atoms, such as 2-ethylhexanol, isononyl alcohol or isotridecyl alcohol.

Hydroxy- and carboxy-functional low molar mass polyester polyols prepared in accordance with the invention can also be chemically or physically modified by reaction, for example, with isocyanate compounds or compounds which comprise oxirane groups. The reaction with isocyanate compounds leads to urethane groups on the low molar mass polyester polyol of the invention. The reaction with the oxirane compounds leads to additional secondary OH groups.

It is also possible to incorporate low molar mass urea derivatives, leading to what are known in the coatings industry as sag controlled acrylate resins. For this purpose, for example, the low molar mass polyester polyol can be introduced as an initial charge, in the form of a mixture with monoamines or polyamines, and suitable mono- or polyfunctional isocyanates are added. In addition, the low molar mass polyester polyols of the invention may be esterified (modified) at least in part using phosphoric acid, before being used.

Preferably, the polyester polyols can also be mixed with acrylate copolymers, especially those of low molar mass.

At the same time, the novel low molar mass polyester polyols can also be the basis of (grafted-on) acrylate polymers, as described for example in EP-A 0 776 920 and in European Patent Application EP 98114777.0 which are incorporated herein by reference in their entireties. In this case, either the ester resin character (mass fraction of the acrylate component less than 50%) or the acrylate resin character (mass fraction of the acrylate component more than 50%) may predominate. Also possible, of course, is a composition with equal or substantially equal proportions of ester and acrylate resin.

The invention therefore also relates to mixtures comprising the low molar mass polyester polyols and a copolymer prepared separately or in the presence of the polyester polyol by free-radical addition polymerization, the monomer mixture on which the copolymer is based preferably comprising at least one olefinically unsaturated monomer g), which is an alkyl ester of an aliphatic linear, branched or cyclic (,4-unsaturated monocarboxylic acid or an alkyl diester of an olefinically unsaturated aliphatic linear, branched or cyclic dicarboxylic acid of 1 to 20, preferably 2 to 12 carbon atoms in the linear, branched or cyclic alkyl radical and 3 to 10, preferably 4 to 7 carbon atoms in the acid residue of the ester, furthermore, at least one hydroxyalkyl ester h) of one of the mono- or dicarboxylic acids specified under g), in which the hydroxyalkyl radical is derived from an at least dihydric aliphatic linear, branched or cyclic alcohol of 2 to 15, preferably 3 to 8 carbon atoms, at least one carboxylic acid i) selected from the monocarboxylic and dicarboxylic acids specified under g), in nonesterified form or else, in the case of the dicarboxylic acids, in a form in which it is monoesterified with one of the alkyl radicals specified under g) or one of the hydroxyalkyl radicals specified under h), and also, if desired, at least one further olefinically unsaturated monomer j) selected from vinylaromatic compounds such as styrene, c-methylstyrene, vinyltoluene, chlorostyrene, vinyl esters of aliphatic linear, branched or cyclic monocarboxylic acids of 2 to 20, preferably 3 to 12 carbon atoms, vinyl halides such as vinyl chloride, vinylidene chloride, unsaturated nitriles such as acrylo- and methacrylonitrile, amides and diamides of the acids specified under i), vinyl ethers of aliphatic linear, branched or cyclic alcohols of 1 to 18 carbon atoms, esters of glycidyl alcohol or methylglycidyl alcohol with olefinically unsaturated carboxylic acids, and olefinically unsaturated ketones of 4 to 21 carbon atoms.

These mixtures can be prepared, for example, by admixing the copolymer to the polyester polyol, the mass ratio of the solids contents of the polyester polyol and of the copolymer preferably being from 1:9 to 9:1, most preferably from 7:3 to 3:7. The two components are customarily mixed by intimately mixing the solutions of both components. In this context, "intimate mixing" means to reach a state where no inhomogeneities are perceptible to the naked eye. The term used in this case is mixtures or blends.

In accordance with the invention, the mixtures can also be suitably prepared, preferably, for example, by polymerizing the monomer mixture on which the copolymer is based in the presence of the polyester polyol, with the ratio of the mass of the solids content of the polyester polyol to the mass of the monomer mixture on which the copolymer is based preferably being from 9:1 to 1:9, most preferably from 7:3 to 3:7. In this case, one speaks of a "partially grafted polymer".

In both cases, the monomer mixture preferably comprises mass fractions of g) from 25 to 80% of alkyl (meth)acrylates whose alkyl radicals can be linear, branched or cyclic and are of 1 to 15 carbon atoms, h) from 1 to 35% of hydroxyalkyl (meth)acrylates whose hydroxyalkyl radicals can be linear, branched or cyclic and have 2 to 20 carbon atoms, i) from 0.5 to 20% of $\alpha,\beta$-unsaturated carboxylic acids, and j) from 0 to 55% of aromatic vinyl compounds or aliphatic vinyl esters and vinyl ethers, vinyl halides, olefinically unsaturated ketones, esters of glycidyl alcohol or methylglycidyl alcohol with olefinically unsaturated carboxylic acids, or nitriles of $\alpha,\beta$-unsaturated carboxylic acids, the sum of the mass fractions of components g) to j) necessarily being 100% and components g) to j) being preferably selected such that polymerization of this mixture without further additions would preferably result theoretically in an acrylate copolymer having an acid number of at least 5 mg/g and a hydroxyl number of from 30 to 190 mg/g. Mass fraction as used herein conforms to the normal rules and means the ratio of the mass of a specific component to the sum of masses of all components in the mixture. The polymerization preferably takes place in the presence of known free-radical polymerization initiators and, if desired, of a chain transfer agent.

Component g) is preferably selected from esters of acrylic and methacrylic acid with methanol, ethanol, n- and isopropanol, n-, sec-, iso- and tert-butanol.

Component h) is preferably selected from esters of acrylic and methacrylic acid with glycol, 1,2- and 1,3-propanediol and 1,4-butane diol.

Component i) is preferably selected from acrylic and methacrylic acid.

Component j) is preferably selected from styrene, the isomeric vinyl toluenes, and $\alpha$-methylstyrene.

The novel low molar mass polyester polyols of the invention preferably possess a weight-average molar mass $M_w$ of from 500 to 1500 g/mol, a hydroxyl number of preferably from 100 to 250, in particular from 140 to 240 mg/g, and an acid number of preferably from 10 to 30, in particular from 15 to 25 mg/g, and preferably comprise mole fractions (in mol/100 mol =%) of units derived from:

a) from 7 to 30% of aliphatic polycyclic polyhydroxy compounds having at least two hydroxyl groups per molecule, b) from 10 to 50% of branched aliphatic acyclic dihydroxy compounds, c) from 32 to 45% of aliphatic cyclic polycarboxylic acids, d) from 0 to 25% of aliphatic acyclic or monocyclic polyhydroxy compounds having three or more hydroxyl groups per molecule, and e) from 0 to 5% of polyfunctional compounds selected from aliphatic linear and monocyclic dihydroxy compounds, aliphatic linear and branched dicarboxylic acids, aromatic dicarboxylic acids, aromatic hydroxycarboxylic acids, and polycarboxylic acids having three or more carboxyl groups per molecule, and also the mole fractions indicated in each case under a), b), c), d) and e) adding up to 100%. A mole fraction of a component B in a mixture is customarily defined as the ratio of the amount of substance of component B to the sum of the amounts of substance of all components present in the mixture.

The low molar mass polyester polyols of the invention can be prepared in any desired way such as batchwise or continuously. Also possible methods include multistage procedures with and without superatmospheric pressure.

The low molar mass, OH- and COOH-functional polyester polyols of the invention can be partially dissolved, to a selectable extent, with freely chosen solvents or solvent mixtures.

The low molar mass polyester polyols of the invention—alone and/or in mixture—are particularly suitable for coatings applications in one- and two-component systems, especially for high-solids systems—that is, for mixtures containing solvent and having a high solids content. High solids content in this context means a mass fraction of solids of more than 70, preferably more than 75, and not preferred more than 80%.

Examples of suitable solvents for the oligoester polyols of the invention or the mixtures comprising them include aliphatic, cycloaliphatic and aromatic hydrocarbons, such as alkylbenzenes, e.g., xylene, toluene; esters, such as ethyl acetate, butyl acetate, acetates with longer alcohol residues, butyl propionate, pentyl propionate, ethylene glycol monoethyl ether acetate, the corresponding methyl ether acetate, and propylene glycol methyl ether acetate; ethers, such as ethylene glycol monoethyl, monomethyl or monobutyl ether; glycols; alcohols; ketones such as methyl isoamyl ketone and methyl isobutyl ketone; lactones, and mixtures of such solvents. Further solvents which can be employed include reaction products of lactones with glycols or alcohols.

The present invention additionally provides coating compositions which comprise low molar mass polyester polyols of the invention, alone or in a blend with other organic polyhydroxy compounds. Acrylate copolymers of the type described above are particularly suitable as a co-component of the mixture. These high-solids coating compositions can be employed in particular in the coating of metal panels (especially in automotive OEM finishing and refinishing, and for general industrial applications, such as steel bridges, for example), in the coating of plastics and wood, and in the field of coating of textiles, leather, paper and building materials.

The low molar mass polyester polyols and mixtures comprising these low molar mass polyester polyols can be cured in any desired way such as cold curing in the presence of suitable crosslinkers or at elevated temperature.

Suitable curing components in these coating compositions include amino resins, polyisocyanates or anhydride-functional compounds, individually or in combination. The cross-linker can be added in each case in an amount such that the ratio of the number of OH groups of the low molar mass polyester polyol (or of the mixtures comprising them) to the number of reactive groups of the crosslinker preferably lies between 0.3:1 and 3:1.

Amino resins suitable as the curing component are preferably urea resins, melamine resins and/or benzoguanamine resins. These are etherified urea-, melamine-or benzoguanamine-formaldehyde condensation products, respectively. Suitable mixtures preferably lie within the range from 50:50 to 90:10 for the mass ratio of the low molar mass polyester polyols and of the crosslinkers, based in each case on the mass of the solid resin. Suitable phenolic resins and their derivatives may also be employed as curing agents. In the presence of acids, such as p-toluene sulfonic acid, these crosslinkers lead to full curing of the coating. Heat curing can be performed customarily at temperatures from 90 to 200° C. in, for example, from 10 to 30 minutes.

For the curing of the products of the invention with crosslinking, polyisocyanates are suitable, especially at moderate temperatures or at room temperature. A suitable polyisocyanate component includes in principle any of the aliphatic, cycloaliphatic or aromatic polyisocyanates that are known from polyurethane chemistry, individually or in mixtures. Examples of highly suitable polyisocyanates include those of low molar mass, such as hexamethylene diisocyanate, 2,2,4- and 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and 4,4'-diisocyanatodicyclohexylmethane, 2,4'- and 4,4'-diisocyanatodiphenylmethane, and also mixtures of these isomers with their higher homologs, as are obtainable in a manner known per se by phosgenization of aniline/formaldehyde condensates, and also 2,4- and 2,6-diisocyanatotoluene, and any desired mixtures of such compounds.

It is preferred, however, to employ derivatives of these simple polyisocyanates as are customary in coatings technology. These derivatives include polyisocyanates which have, for example, biuret, uretdione, isocyanurate, urethane, carbodiimide or allophanate groups, as are described, for example, in EP-A 0 470 461, which is incorporated herein by reference in its entirety.

The particularly preferred modified polyisocyanates include N,N',N"-tris(6-isocyanatohexyl) biuret and its mixtures with its higher homologs having more than 1 biuret group, and also N,N',N"-tris(6-isocyanatohexyl) isocyanurate and/or its mixtures with its higher homologs having more than one isocyanurate ring.

For curing at elevated temperature, capped polyisocyanates and also polycarboxylic acids and their anhydrides are additionally suitable.

The low molar mass polyester polyols of the invention and the mixtures comprising them are particularly suitable for preparing high-solids solvent-borne clear coat and top coat materials, and for surfacers.

Coating compositions prepared with the low molar mass polyester polyols of the invention or with the mixtures comprising them may also include other auxiliaries or additives customary in coating technology that have not yet been mentioned. These include, in particular, catalysts, levelling agents, silicone oils, additives such as cellulose esters, especially cellulose acetobutyrate, plasticizers, such as phosphates and phthalates, pigments such as iron oxides, lead oxides, lead silicates, titanium dioxide, barium sulfate, zinc sulfide, phthalocyanine complexes, etc., and fillers such as talc, mica, kaolin, chalk, quartz flour, asbestos flour, slate flour, various silicas, silicates, etc., viscosity modifiers, matting agents, UV absorbers and light stabilizers, antioxidants and/or peroxide scavengers, defoamers and/or wetting agents, active diluents/reactive diluents, and the like.

The coating compositions can be applied to the respective substrate in accordance with known methods: for example, by brushing, dipping, flow coating, roller coating or knife coating, but especially by spraying. They can be applied with heat and, if desired, be brought into an application-ready form by injection of supercritical solvents (e.g. $CO_2$). Automotive, industrial, plastics, wood, building-material and textile coating materials having excellent properties can be obtained with binders or binder mixtures prepared using the low molar mass polyester polyols of the invention. These binders can be employed to prepare both intermediate coats and pigmented or unpigmented top coats.

For this purpose, the coating materials are generally cured within the temperature range from −20 to +100° C., preferably from −10 to +80° C.

EXAMPLES

In the following examples, all figures with the unit "%" are mass fractions in g/(100 g) of the substance concerned in the mixture, unless specified otherwise. Parts are always parts by mass. Concentration figures in "%" refer to the ratio of mass of the dissolved substance in g in 100 ml of the solution.

1a Preparing the low molar mass polyester polyols

The starting components were heated under nitrogen at from 190 to 200° C. and the water of reaction formed was removed continually. The temperature was increased continuously to 220° C. until the acid number was between 15 and 25 mg of KOH/g. Thereafter, the low molar mass polyester polyol was partially dissolved to give an 80% strength solution with butyl acetate ("80 BAC") (Table 1).

In the table, the mole fractions of the starting components are indicated in the unit mol/100 mol=%.

TABLE 1

| Oligoester polyol/80 BAC | | | | |
|---|---|---|---|---|
| | 1 | 2 | 3 | C1 |
| 3(4),8(9)-bishydroxymethyl-tricyclo-[5.2.1.0$^{2,6}$]decane$^{(+)}$ | 12.4 | 22.0 | 24.5 | — |
| neopentyl glycol | 47.0 | 41.9 | 13.5 | 23.4 |
| hexahydrophthalic anhydride | 40.6 | 36.1 | 40.0 | 46.9 |
| trimethylolpropane | — | — | 22.0 | 29.7 |
| Characteristics: | | | | |
| acid number acc. to DIN 53402 in mg/g | 23 | 20 | 18 | 23 |
| OH number acc. to DIN 53240 T2 in mg/g | 179 | 221 | 215 | 185 |
| Viscosity 50% BAC, 23° C. acc. to DIN EN ISO 3219 in mPa · s | 10 | 17 | 29 | 51 |

TABLE 1-continued

| Oligoester polyol/80 BAC | | | | |
|---|---|---|---|---|
| | 1 | 2 | 3 | C1 |
| weight-average molar mass$^\#$ $M_w$ in g/mol | 1040 | 880 | 1240 | 4430 |
| number-average molar mass$^\#$ $M_n$ in g/mol | 735 | 620 | 770 | 1665 |
| U = $M_w/M_n$ | 1.4 | 1.4 | 1.6 | 2.7 |
| Hazen color number (s.f.) acc. to DIN 53995 | 15 | 25 | 45 | 105 |
| Appearance | clear | clear | clear | clear |

BAC: n-butyl acetate
$^\#$measured by GPC (calibration with polystyrene from Polymer Standards Service GmbH, Mainz (DE))
*C1 is Example 1 of EP-A-0 705 858; for Example 2 thereof: $M_w$ = 11,400 g/mol, $M_n$ = 2070 g/mol, U = 5.5 viscosity dissolved 50% in BAC, 23° C., according to DIN EN ISO 32 9: 92 mPa · s
$^{(+)}$trade name: TCD-Alkohol DM (Celanese GmbH, Oberhausen (DE))
s.f.: supply form Result:

The low molar mass polyester polyols of the invention have weight-average molar masses M, in the range of oligomers (from 500 to 1500 g/mol) and narrow distributions U<2.

The viscosities of their 50% strength solutions (50 g of polymer in 100 g of solution) in butyl acetate (according to DIN EN ISO 3251 incorporated herein by reference) are not more than 40 mPaws (measured in accordance with DIN EN ISO 3219 at 23° C incorporated herein by reference).

1b Preparing acrylate copolymer

Precursor: Oligoester polyol 4

The oligoester polyol is prepared in accordance with Example 3 and then is partially dissolved with an aromatics mixture (solvent naphtha 1 50/180 (SNA), e.g., Shellsol A from Shell Chemicals) to give a solution having a solids content by mass of 78.5% (DIN EN ISO 3251 incorporated herein by reference).

TABLE 2

| Characteristic values | | |
|---|---|---|
| Acid number according to DIN 53402 | mg/g | 17.9 |
| OH number according to DIN 53240 T2 | mg/g | 210 |
| Visc. 50% SNA, 23° C. according to DIN EN ISO 3219 | mPa · s | 102 |
| Weight-average molar mass$^\#$ $M_w$ | g/mol | 1319 |
| Number-average molar mass$^\#$ $M_n$ | g/mol | 813 |
| U = $M_w/M_n$ | | 1.6 |

$^\#$measured by GPC (calibration with polystyrene from Polymer Standards Service GmbH, Mainz (DE))

Novel acrylate copolymer

A 2 liter three-necked flask equipped with stirrer, heating and cooling system, inert gas inlet and feed device was charged with 222 g of the solution of the oligopolyester polyol 4 and 237.4 g of solvent naphtha 150/180 (hydrocarbon mixture with a boiling range of 150 to 180° C.) and this initial charge was rendered inert with nitrogen and heated to the boiling temperature of 168° C. Thereafter, 281.9 g of butyl acrylate, 59.4 g of methyl methacrylate, 227.5 g of hydroxyethyl methacrylate, 14.8 g of acrylic acid, 105.6 g of styrene and 7.9 g of tertdodecyl mercaptan were metered in via the dropping funnel over the course of 6 hours. Simultaneously, 19.8 g of di-tert-amyl peroxide dissolved in 99 g of solvent naphtha 150/180 were metered in. After 6 hours, the batch was reinitiated with 2 g of di-tertamyl peroxide in 10 g of solvent naphtha 150/180, and reaction was continued for 2 hours. The product was adjusted with 100 g of BAC to a solids content of 70.8% by mass (determined in accordance with DIN EN ISO 3251 incorporated herein by reference).

The end product was highly transparent and had the following characteristics:

acid number 11.5 mg/g, hydroxyl number 99 mg/g, dynamic viscosity (according to DIN EN ISO 3219, incorporated herein by reference at 23° C., supply form) 6510 mpa•s, dynamic viscosity (diluted to 50% solids content by mass with addition of BAC, according to DIN EN ISO 3219, incorporated herein by reference at 23° C.) 70 mPa•s.

The weight-average molar mass M, was 6035 g/mol, the polydispersity U was 2.8 (calibration with PS).

1c Preparing a mixture (blend 1, B1)

A mixture of the polyester polyol 3 (80% strength in BAC) and the low molar mass acrylate copolymer of EP-A 0 638 591 (the disclosure of which is incorporated herein by reference) was prepared by mixing equal masses of the solid resins:

| | |
|---|---|
| Polyester polyol 3/80 BAC | 100 g initial weight |
| Low molar mass acrylate copolymer 1 from EP-A 0 638 591/75.1 BAC | 106.5 g initial weight |
| | 206.5 g |

This mixture was adjusted to a solids content of 75% by mass by adding BAC.

TABLE 3

Characteristic values of the blend B1

| | | |
|---|---|---|
| Acid number | mg/g | 14.8 |
| OH number | mg/g | 181 |
| Visc. 50% BAC, 23° C. according to DIN EN ISO 3219 | mPa · s | 39 |
| Hazen color number (DIN 53995; Pt/Co) | | 46 |
| Appearance | | Clear |

Result:

The mixture of polyester of the invention and acrylate copolymer (from EP-A 0 638 591 incorporated herein by reference) is transparent. The blend B I is a compatible, homogeneous mixture.

The polyester polyols of Comparative Examples 1 and 2 (Examples 1 and 2 of EP-A 0 705 858 incorporated herein by reference) have neither the low molar masses $M_w$ nor possess such low solution viscosities of not more than 40 mPa•s (measured, for example, in accordance with the abovementioned conditions).

The low molar mass polyester polyols of the invention are solid masses in the cooled state (23° C.) and in undiluted forms. This means that they have glass transition temperatures of more than 20° C.

II Preparing the coating materials

The curable coating compositions of the invention are prepared by mixing the components, consisting of a low molar mass polyester polyol of the invention or of a mixture of organic polyhydroxy compounds comprising at least one low molar mass polyester polyol of the invention with the auxiliaries and additives, solvents and crosslinkers in the mixing ratio described and adjusting the mixture with further diluent to the flow time (spray viscosity) of 21 seconds with the flow cup (DIN 52 211, 23° C. incorporated herein by reference). In the case of binder components of low viscosity this can be done in bulk, with heating to higher temperatures if necessary. Products of higher viscosity are— unless the curable mixtures are employed as powder coating materials—dissolved or dispersed in the abovementioned diluents, prior to mixing. In the case of pigmented systems, a pigment paste is first produced in a dispersing step from the corresponding pigments together with the low molar mass polyester polyol of the invention or with a mixture of two or more polyols of the invention, or other polyols, with or without the addition of a suitable special grinding resin, in a dispersing apparatus of appropriate construction. This paste is mixed as it is, or with the addition of further binder based on the components or a mixture thereof or else on an extraneous resin which is compatible with the other components of the coating system in question, and the mixture is made up by adding further diluent or typical coatings additives. The pot life and the properties of the resulting films depend on the process conditions—that is, on the nature and amount of starting materials, on the metering of the catalyst, on the temperature regime, etc. Curing can be operated batchwise or carried out continuously by means, for example, of an automatic coating device.

IIa Preparing the ultra high-solids clear coat materials

With the initial weights of the components as indicated in Table 4, clear coats were prepared and were then all adjusted to a flow time of 21 s by adding further solvent mixture (DIN 53211, incorporated herein by reference at 23° C.).

TABLE 4

| | | 1 | 2 | 3 | B1 | Comparison* |
|---|---|---|---|---|---|---|
| Binder | | | | | | |
| Mass fractions of solids | in % | 80 | 80 | 80 | 75 | 79.9 |
| OH number | in mg/g | 179 | 221 | 215 | 181 | 185 |
| w (OH) | in % | 5.4 | 6.6 | 6.5 | 5.5 | 5.6 |
| Binder, initial weight | in g | 93.7 | 90.0 | 86.1 | 67.8 | 82.4 |
| Solvent, initial weight# | in g | 19.5 | 18.7 | 17.9 | 15 | 17.1 |
| Tinuvin 1130 | in g | 1.9 | 1.8 | 1.7 | 1.3 | 1.6 |
| Tinuvin 292 | in g | 0.7 | 0.6 | 0.6 | 0.5 | 0.6 |
| Additol VXL 4930 | in g | 0.2 | 0.2 | 0.2 | 0.2 | 0.2 |
| Desmodur N 3300 | in g | 46.5 | 55.5 | 51.5 | 32.0 | 42.5 |
| BAC/SNA/X (60:15:25)+ | in g | 37.5 | 33.2 | 42.0 | 27.0 | 55.6 |
| Flow time from standard cup DIN 53211/2 | in s | 21 | 21 | 21 | 21 | 21 |
| Coating designation | | 1 | 2 | 3 | 4 | Comparison a |
| Calculated coating composition: | | | | | | |
| Mass fraction of solvent | in % | 37.9 | 35.0 | 38.6 | 41 | 44.6 |
| Mass fraction of solvent | in % | 62.1 | 65.0 | 61.4 | 59 | 55.4 | solvent: mixture of butyl acetate/solvent naphtha/xylene (BAC/SNA/X) in the ratio 60:15:25 by mass
*Example 1 of EP-A 0 705 858 (incorporated herein by reference)
Solids content by mass determined according to DIN EN ISO 3251 (incorporated herein by reference)
w(OH)  mass fraction of hydroxyl groups
® Tinuvin 1130  UV absorber (Ciba-Geigy, Basal (CH))
® Tinuvin 292  HALS (light stabilizer) (Ciba-Geigy, Basal (CH))
® Additol VXL 4930  leveling agent (Vianova Resins GmbH, Wiesbaden (DE))

TABLE 4-continued

® Desmodur N 3300 polyisocyanate (Bayer AG, Leverkusen (DE))
Following the preliminary standard dilution indicated in the first part of the table, the clear coats were each adjusted to a flow time of 21 s with further, different amounts of diluent (BAC/SNA/X 60:15:25) - the above values are therefore calculated values; cf.

IIb Preparing an ultra high-solids spray surfacer

Spray surfacers were prepared with the low molar mass polyester polyol of the invention, in accordance with the recipe of Table 3, and were tested in comparison with the polyester polyol of EP-A 0 705 858, Example 1, incorporated herein by reference.

TABLE 5

| Binder | | 3 | Comparison |
|---|---|---|---|
| Solids content by mass according to DIN EN ISO 3251 | in % | 80 | 79.9 |
| OH number | in mg/g | 215 | 185 |
| Binder, initial weight | in g | 16.5 | 16.5 |
| Solvent mixture | in g | 13.5 | 18.0 |
| Pigment mixture | in g | 58.6 | 58.6 |
| Additol VXL 4930 | in g | 0.04 | 0.04 |
| Additol XL 280 | in g | 1.3 | 1.3 |
| Additol XL 251 | in g | 1.1 | 1.1 |
| Defoamer | in g | 0.2 | 0.2 |
| Catalyst | in g | 0.33 | 0.33 |
| Desmodur N 3300 | in g | 9.9 | 8.5 |
| Solvent mixture | in g | 6.6 | 5.7 |
| Paint designation | | 3 | Comparison b |

Solvent mixture: methoxypropyl acetate, butyl acetate and xylene in a ratio of 1:1:1 by mass
Pigment mixture: consisting of 13.8 parts of titanium dioxide (Kronos Titan GmbH Leverkusen (DE)) 0.1 part of 7Printex U (Degussa, Frankfurt/Main (DE)), 47.1 parts of microtalc (Naintsch Mineralwerke GmbH, Graz (AT)) and 39 parts of barium sulfate (Deutsche Baryt Industrie, Bad Lauenburg (DE))
® Additol VXL 4930 leveling agent (Vianova Resins GmbH, Wiesbaden (DE))
® Additol XL 280 antisettling paste (Vianova Resins GmbH, Wiesbaden (DE))
® Additol XL 251 wetting agent (Vianova Resins GmbH, Wiesbaden (DE))
Defoamer: ® Perenol E1 (Henkel KGaA, Düsseldorf (DE))
Catalyst: ® Metatin 712, 1% strength solution in xylene (Acima AG, Buchs (CH))
® Desmodur N 3300: polyisocyanate (Bayer AG, Leverkusen (DE))

The coating compositions described above were prepared in a manner known to the person skilled in the art and, following the addition of the polyisocyanate solution, were adjusted to processing viscosity (21 s flow time in accordance with DIN 53211, 23° C incorporated herein by reference) with a solvent mixture consisting of methoxypropyl acetate, butyl acetate and xylene in a ratio of 1:1:1.

This resulted in the following mass fraction of (according to DIN EN ISO 3251, incorporated herein by reference):

TABLE 6

| Paint designation | | 3 | Comparison b |
|---|---|---|---|
| Solids content by mass | in % | 75 | 70 |

IIc Preparation of ultra high-solids top coat materials

White-pigmented top coat materials were prepared with the low molar mass polyester polyol of the invention, in accordance with the recipe of Table 7, and were tested in comparison with the polyester polyol from EP-A 0 705 858, Example 1.

TABLE 7

| Binder | 3 | Comparison |
|---|---|---|
| Mass fractions of solids (%) | 80 | 79.9 |
| OH number (mg/g) | 215.0 | 185 |
| Binder, initial weight (g) | 42.0 | 42.0 |
| Solvent mixture (g) | 6.4 | 9.5 |
| Titanium dioxide (g) | 47.8 | 47.8 |
| Additol VXL 6212 (g) | 2.4 | 2.4 |
| Leveling agent (g) | 0.9 | 0.9 |
| Catalyst (g) | 0.5 | 0.5 |
| Desmodur N 3300 (g) | 25.1 | 21.6 |
| Solvent mixture (g) | 17.9 | 17.9 |
| Paint designation | 3 | Comparison c |

Solvent mixture: methyl amyl ketone, butylglycol acetate, Methoxypropyl acetate in a ratio of 60:15:25 by mass
Titanium dioxide: Kronos Titan GmbH, Leverkusen (DE)
® Additol VXL 6212: wetting agent (Vianova Resins GmbH & Co. KG, Wiesbaden (DE))
Leveling agent: ® Troysol S 366 (Troy Chem. Comp., New Jersey (US))
Catalyst: ® Metatin 712 1% strength solution in xylene (Acima AG, Buchs (CH))
® Desmodur N 3300: polyisocyanate (Bayer AG, Leverkusen (DE))

The coating compositions described above were prepared in a manner known to the person skilled in the art and, following the addition of the polyisocyanate solution, were adjusted to processing viscosity (21 s flow time according to DIN 53211, 23° C.) with a solvent mixture consisting of methyl amyl ketone and butylglycol acetate in a ratio of 6:4 by mass. This resulted in the following mass fraction of solids (according to DIN EN ISO 3251):

| Paint designation | | 3 | Comparison c |
|---|---|---|---|
| Mass fraction of solids | in % | 74 | 69 |

II Performance testing of coating materials
IIIa Performance testing of very high-solids clear coats The coating systems prepared as in fi were applied to cleaned glass plates using a 200 μm coating bar and were

TABLE 8

| | | Application: Atmospheric humidity (rel.) 65% | | | | |
|---|---|---|---|---|---|---|
| Coating designation | | 1 | 2 | 3 | 4 | Comparison a |
| Appearance | | transparent | Transparent | transparent | transparent | transparent |
| Initial/pot life[a] | in h | 3 to 4 | 2 to 3 | 4 | 4 | 4 |
| Tack-free time[b] | in h | 4 | 3.5 | 4.5 | 3.5 | 3.5 |
| Mass fraction of solids[c] | in % | 66.0 | 68.2 | 65.0 | 62 | 59.1 |

TABLE 8-continued

Application: Atmospheric humidity (rel.) 65%

| Coating designation | 1 | 2 | 3 | 4 | Comparison a |
|---|---|---|---|---|---|

[a] Time until the initial viscosity of the coating material has doubled
[b] Time until the coating material is no longer tacky (thumb test)
Mass fraction of solids of the coating material determined by practical means (DIN EN ISO 3251)

Result:

The mass fractions of solids that are achieved in the clear coat are greater than 60%. All products show rapid initial drying (i.e. the initial solvent evaporation rate within the first 15 minutes is higher than in the comparison).

The comparative example gives a mass fraction of the coating material of 59. 1%, just below 60%.

UV yellowing:

Sample: 300 μm wet film drawn onto white tiles

By means of a UV irradiation unit (speed 4 m/min, lamp output 2×80 W/cm) the 4 tiles with the coating materials comprising the binders of the invention, including the comparison tile (coating material comprising the comparative polyester polyol of EP-A 0 705 858) were subjected to 10, 20 and 30 cycles.

Result:

It was not possible to determine any yellowing in the case of the coating materials comprising the low molar mass polyester polyols of the invention and in the case of the comparison.

Mechanical values:

Forced drying: evaporation for 10 minutes, 30 minutes at 80° C.

1) on glass plates

TABLE 9

| Coating material | 1 | 2 | 3 | 4 | Comparison a |
|---|---|---|---|---|---|
| Dry film thickness in μm (ISO 2808) (incorporated herein by reference) | 52 | 55 | 52 | 55 | 40 |
| König pendulum hardness (DIN 53157) | | | | | |
| after 1 h at RT in s | 155 | 179 | 186 | 180 | 193 |
| after 1 d at RT in s | 175 | 193 | 207 | 210 | 206 | h = hour; d = day; RT = room temperature

Result:

The pendulum hardnesses achieved are extremely high. No reduction can be found on the basis of the extremely low molar mass binder.

2) on cold-rolled metal sheet

TABLE 10

| Coating material | 1 | 2 | 3 | 4 | Comparison a |
|---|---|---|---|---|---|
| Dry film thickness according to DIN 50982 (incorporated herein by reference) in μm | | | | | |
| after 1 h RT | 46 | 63 | 64 | 60 | 63 |
| after 1 d RT | 46 | 63 | 64 | 60 | 63 |
| Cupping according to ISO 1520 (incorporated herein by reference) in mm | | | | | |
| after 1 h RT | >10 | >10 | >10 | >10 | >10 |
| after 1 d RT | >10 | >10 | >10 | >10 | >10 |
| Cross-hatch according to DIN 53151 (incorporated herein by reference) | | | | | |
| after 1 h RT | 0 | 0–1 | 0 | 0 | 2–3 |
| after 1 d RT | 0–1 | 0 | 0 | 0–1 | 5 |

Result:

All products show good elasticity on cold-rolled sheet metal. At the same time, the adhesion of the products of the invention is outstanding. The adhesion of the comparison product, on the other hand, is deficient.

IIIb Performance testing of the spray surfacer

The coating systems obtained in accordance with IIb were applied by spraying to degreased metal sheets (dry film thickness about 70 μm). Pendulum hardness, cupping and cross-hatch were tested after drying at room temperature for 7 days.

TABLE 11

| Coating designation | | 3 | Comparison b |
|---|---|---|---|
| Mass fractions of solids according to DIN EN ISO 3251 (incorporated herein by reference) | in % | 75 | 70 |
| Pot life | in h | 2.5 | 2 |
| Tack-free time | in h | 2 | 2.5 |
| König pendulum hardness according to DIN 53157 | in s | 120 | 115 |
| Cupping according to ISO 1520 | in mm | 5 | 5 |
| Cross-hatch according to DIN 53151 | | Gt0 to Gt1 | Gt5 |

"Pot life": Time until the initial viscosity of the coating material doubles
Tack-free time: Time until the applied coating film is no longer tacky (thumb test)
Cross-hatch: Evaluation: Gt 0 = best value, Gt 5 = worst value Result:

The surfacer based on the binder of the invention shows a longer pot life and at the same time a shorter tack-free time than the comparison. The adhesion of the product of the invention is outstanding, that of the comparison product, on the other hand, deficient.

Moreover, the mass fraction of solids of the comparison surfacer formulation is 5% lower for the same, predetermined viscosity of the ready-to-apply coating material (measured by way of the flow time in accordance with DIN 53 211, 21 seconds). Under completely identical application conditions, therefore, the dry film thicknesses obtained with coating material 3 are about 20% higher than with the coating material according to the comparative example.

IIIc Performance testing of the top coat materials

The coating systems obtained according to IIc were applied to cleaned glass plates using a 200 μm coating bar and were tested following air drying.

TABLE 12

Application: Atmospheric humidity (rel.) 65%

| Coating designation | | 3 | 4 | Comparison c |
|---|---|---|---|---|
| Initial/pot life[a)] | in h | 4 | 4 | 4 |
| Tack-free time[b)] | in h | 4.5 | 3.5 | 3.5 |
| Mass fraction of solids [c)] | in % | 74 | 62 | 69 |

[a)]Time until the initial viscosity of the coating material has doubled
[b)]Time until the coating material is no longer tacky (thumb test)
[c)]Mass fraction of solids content of the coating material determined by practical means (DIN EN ISO 3251)

Result:

The mass fraction of solids in the top coat based on the low molar mass polyester polyol of the invention is greater than 70%.

The comparative example has a solids content by mass in the coating material of just below 70%.

Mechanical values:

Forced drying: evaporation for 10 minutes, 30 minutes at 80° C.

1) on glass plates

TABLE 13

| Coating material | | 3 | Comparison c |
|---|---|---|---|
| Dry film thickness (ISO 2808) | in μm | 60 | 55 |
| König pendulum hardness (DIN 53157) | | | |
| after 1 h at RT | in s | 143 | 145 |
| after 1 d at RT | in s | 180 | 178 | h = hour; d = day; RT = room temperature

Result:

The pendulum hardnesses achieved are extremely high. No reduction can be found on the basis of the extremely low molar mass binder.

2) on cold-rolled metal sheet

TABLE 14

| Coating material | | 3 | Comparison c |
|---|---|---|---|
| Dry film thickness according to DIN 50982 | in μm | 65 | 65 |
| Cupping according to ISO 1520 | in mm | | |
| after 1 h RT | | >10 | >10 |
| after 1 d RT | | >10 | >10 |
| Cross-hatch according to DIN 53151 | | | |
| after 1 h RT | | 0 | 3–3 |
| after 1 d RT | | 0–1 | 5 |

Result:

All products show good elasticity on cold-rolled sheet metal. At the same time, the adhesion of the product of the invention is outstanding. The adhesion of the comparison product, on the other hand, is deficient.

We claim:

1. A mixture comprising
   I) a low molecular mass polyester polyol having a weight-average molar mass $M_w$ of not more than 2000 g/mol, with a hydroxyl number of from 80 to 300 mg/g and an acid number of from 5 to 35 mg/g, comprising mole fractions in % of structural units derived:

a) from 1 to 45% of an aliphatic polycyclic polyhydroxy compound having at least two hydroxyl groups per molecule;

b) from 5 to 50% of a branched aliphatic acyclic dihydroxy compound;

c) from 30 to 50% of an aliphatic cyclic polycarboxylic acid;

d) from 0 to 30% of an aliphatic acyclic or monocyclic polyhydroxy compound having three or more hydroxyl groups per molecule, e) from 0 to 10% of a polyfunctional compound selected from the group consisting of aliphatic linear and monocyclic dihydroxy compounds, aliphatic linear and branched dicarboxylic acids, aromatic dicarboxylic acids and polycarboxylic acids having three or more carboxyl groups per molecule; and f) from 0 to 10% of a monofunctional unit selected from the group consisting of monocarboxylic acids and monoalcohols, the molar % indicated in each case under a), b), c), d), e) and f) adding up to 100%;

and

II) a copolymer prepared separately or in the presence of said polyester polyol by free-radical addition polymerization, the monomer mixture on which the copolymer is based comprising:

at least one olefinically unsaturated monomer g), which is an alkyl ester of an aliphatic linear, branched or cyclic α,β-unsaturated monocarboxylic acid or an alkyl diester of an olefinically unsaturated aliphatic linear, branched or cyclic dicarboxylic acid of 1 to 20 carbon atoms in the alkyl radical and 3 to 10 carbon atoms in the acid residue of the ester, at least one hydroxyalkyl ester h) of said mono- or dicarboxylic acids specified under g), in which the hydroxyalkyl radical is derived from an at least dihydric aliphatic linear, branched or cyclic alcohol of 2 to 15 carbon atoms, at least one carboxylic acid i) selected from the group consisting of said monocarboxylic and dicarboxylic acids specified under g), in nonesterified form or, in the case of the dicarboxylic acids, in a form in which said dicarboxylic acid is monoesterified with one of the alkyl radicals specified under g) or one of the hydroxyalkyl radicals specified under h), and optionally, at least one further olefinically unsaturated monomer j) selected from the group consisting of vinylaromatic compounds vinyl halides, unsaturated nitriles, amides and diamides of the acids specified under i), vinyl ethers of aliphatic linear, branched or cyclic alcohols of 1 to 18 carbon atoms and olefinically unsaturated ketones of 4 to 21 carbon atoms.

2. A mixture as claimed in claim 1, wherein the copolymer is admixed with the polyester polyol and where the mass ratio of the solids of the polyester polyol to the copolymer is from 1:9 to 9:1.

3. A mixture as claimed in claim 1, wherein the copolymer is polymerized in the presence of the polyester polyol and the mass ratio of the solids of the polyester polyol to the copolymer is from 9:1 to 1:9.

4. A mixture as claimed in claim 1, wherein the monomer mixture comprises mass fractions of g) from 25 to 80% of alkyl (meth)acrylates whose alkyl radicals are linear, branched or cyclic and are of I to 20 carbon atoms, h) from 1 to 35% of hydroxyalkyl (meth)acrylates whose hydroxyalkyl radicals are linear, branched or cyclic and have 2 to 20 carbon atoms, i) from 0.5 to 20% of α,β-unsaturated carboxylic acids, and j) from 0 to 55% of aromatic vinyl compounds or aliphatic vinyl esters and vinyl ethers, vinyl halides, olefinically unsaturated ketones or aldehydes, esters of glycidyl alcohol or methylglycidyl alcohol with olefinically unsaturated carboxylic acids, or nitriles of α,β-unsaturated carboxylic acids, the sum of the mass fractions of components g) to j) necessarily being 100% and components g) to j) being selected such that polymerization of said components g) to j) without further additions would result theoretically in an acrylate copolymer having an acid number of at least 5 mg/g and a hydroxyl number of from 30 to 190 mg/g.

5. A mixture as claimed in claim 1, wherein said component g) is selected from the group consisting of esters of acrylic and methacrylic acid with at least one of methanol, ethanol, n- and iso-propanol, n-, sec-, iso- and tert-butanol.

6. A mixture as claimed in claim 1, wherein said component h) is selected from the group consisting of esters of acrylic and methacrylic acid with at least one of glycol, 1,2- and 1,3-propanediol, and 1,4-butane diol.

7. A mixture as claimed in claim 1, wherein said component i) is selected from the group consisting of acrylic and methacrylic acids.

8. A mixture as claimed in claim 1, wherein said component j) is selected from the group consisting of styrene, isomeric vinyltoluenes, and a-methylstyrene.

9. A one-component coating material comprising a low molecular mass polyester polyol having a weight-average molar mass $M_w$ of not more than 2000 g/mol, with a hydroxyl number of from 80 to 300 mg/g and an acid number of from 5 to 35 mg/g, comprising mole fractions in % of structural units derived from:

a) from 1 to 45% of an aliphatic polycyclic polyhydroxy compound having at least two hydroxyl groups per molecule, b) from 5 to 50% of a branched aliphatic acyclic dihydroxy compound:

c) from 30 to 50% of an aliphatic cyclic polycarboxylic acid:

d) from 0 to 30% of an aliphatic acyclic or monocyclic polyhydroxy compound having three or more hydroxyl groups per molecule;

e) from 0 to 10% of a polyfunctional compound selected from the group consisting of aliphatic linear and monocyclic dihydroxy compounds, aliphatic linear and branched dicarboxylic acids, aromatic dicarboxylic acids and polycarboxylic acids having three or more carboxyl groups per molecule; and f) from 0 to 10% of a monofunctional unit selected from the group consisting of monocarboxylic acids and monoalcohols.

the molar % indicated in each case under a), b), c), d), e) and f) adding up to 100%.

10. A one-component coating material comprising a mixture of low molar mass polyester polyols with copolymers as claimed in claim 1.

11. A two-component coating material comprising a low molecular mass polyester polyol having a weight-average molar mass $M_w$ of not more than 2000 g/mol, with a hydroxyl number of from 80 to 300 mg/g and an acid number of from 5 to 35 mg/g comprising mole fractions in % of structural units derived from:

a) from 1 to 45% of an aliphatic polycyclic polyhydroxy compound having at least two hydroxyl groups per molecule;

b) from 5 to 50% of a branched aliphatic acyclic dihydroxy compound;

c) from 30 to 50% of an aliphatic cyclic polycarboxylic acid;

d) from 0 to 30% of an aliphatic acyclic or monocyclic polyhydroxy compound having three or more hydroxyl groups per molecule;

e) from 0 to 10% of a polyfunctional compound selected from the group consisting of aliphatic linear and monocyclic dihydroxy compounds, aliphatic linear and branched dicarboxylic acids, aromatic dicarboxylic acids and polycarboxylic acids having three or more carboxyl groups per molecule; and f) from 0 to 10% of a monofunctional unit selected from the group consisting of monocarboxylic acids and monoalcohols, the molar % indicated in each case under a). b), c). d). e) and f) adding up to 100%.

12. A two-component coating material comprising a mixture of low molar mass polyester polyols with copolymers as claimed in claim 1.

13. A spray surfacer coating material comprising a low molecular mass polyester polyol having a weight-average molar mass $M_w$ of not more than 2000 g/mol, with a hydroxyl number of from 80 to 300 mg/g and an acid number of from 5 to 35 me/g, comprising mole fractions in % of structural units derived from:

a) from 1 to 45% of an aliphatic polycyclic polyhydroxy compound having at least two hydroxyl groups per molecule:

b) from 5 to 50% of a branched aliphatic acyclic dihydroxy compound;

c) from 30 to 50% of an aliphatic cyclic polycarboxylic acid;

d) from 0 to 30% of an aliphatic acyclic or monocyclic polyhydroxy compound having three or more hydroxyl groups per molecule;

e) from 0 to 10% of a polyfunctional compound selected from the group consisting of aliphatic linear and monocyclic dihydroxy compounds, aliphatic linear and branched dicarboxylic acids, aromatic dicarboxylic acids and polycarboxylic acids having three or more carboxyl groups per molecule: and f) from 0 to 10% of a monofunctional unit selected from the group consisting of monocarboxylic acids and monoalcohols, the molar % indicated in each case under a), b), c), d), e) and f) adding up to 100%.

* * * * *